United States Patent [19]
Ootaki et al.

[11] Patent Number: 5,936,923
[45] Date of Patent: Aug. 10, 1999

[54] OPTICAL PICKUP WITH ABERRATION CORRECTING PANEL INCLUDING A LIQUID CRYSTAL

[75] Inventors: Sakashi Ootaki; Masayuki Iwasaki, both of Tsurugashima, Japan

[73] Assignee: Pioneer Electronic Corporation, Tokyo, Japan

[21] Appl. No.: 08/696,787

[22] Filed: Aug. 14, 1996

[30] Foreign Application Priority Data

Aug. 31, 1995 [JP] Japan ..................................... 7-223535
Feb. 29, 1996 [JP] Japan ..................................... 8-043345

[51] Int. Cl.⁶ ........................................................ G11B 7/00
[52] U.S. Cl. .................................. 369/54; 369/58; 369/112
[58] Field of Search .............................. 369/44.23–44.24, 369/54, 58, 112

[56] References Cited

U.S. PATENT DOCUMENTS

5,281,797  1/1994  Tatsuno et al. .
5,416,757  5/1995  Luecke et al. ........................ 369/44.23
5,661,712  8/1997  Chiba ..................................... 369/116
5,793,735  8/1998  Oono ................................ 369/44.23 X

*Primary Examiner*—W. R. Young
*Attorney, Agent, or Firm*—Finnegan, Henderson, Farabow, Garrett & Dunner, L.L.P.

[57] ABSTRACT

An optical pickup which is designed to correct coma aberration and spherical aberration as well as aberration caused by the relative positional deviation of an objective lens to an aberration correcting liquid crystal panel by using this liquid crystal panel and which is thus compatible to both DVDs and CDs. In the optical pickup having at least a laser light source and an objective lens, an aberration correcting liquid crystal panel is arranged on the optical axis of a laser beam and a transparent electrode of this liquid crystal panel is divided into segments in a predetermined pattern like the cross pattern of a chessboard, and voltages to be applied to the individual segments are variably controlled by a liquid crystal panel controller to alter the refractive index of each segment, thus correcting aberration.

5 Claims, 12 Drawing Sheets

RADIAL DIRECTION

FIG.10B

RADIAL DIRECTION

FIG.10C

RADIAL DIRECTION

FIG.10D

RADIAL DIRECTION

FIG.10E

RADIAL DIRECTION

OPTICAL PICKUP WITH ABERRATION CORRECTING PANEL INCLUDING A LIQUID CRYSTAL

BACKGROUND OF THE INVENTION

1. Field of the Invention

The present invention relates to an optical pickup which reads recorded information from an optical disk, and, more particularly, to an optical pickup which is compatible to both a DVD (Digital Video Disk) and a CD (Compact Disk).

2. Description of Background Information

DVDs are optical disks which can record a vast amount of digital information, and are designed to be 12 cm in diameter, the same as the diameter of CDs, and be able to record digital information, such as moving pictures or computer data, at a recording density of six to eight times that of CDs. To achieve such high-density recording, various tools are designed for DVDs. For SDs (Super-density Disks) which are one type of DVDs, for instance, in order to improve the recording capacity, the wavelength of the laser light source to be used is set to 650 nm or 635 nm, shorter than the wavelength of 780 nm for CDs, the number of apertures NA of the objective lens is set to 0.6, greater than that (0.45) for CDs, and a data compression algorithm as defined in MPEG 2 is used. Accordingly, high density recording of approximately 5 gigabytes (about eight times that for CDs) on one side of each disk.

Because DVDs accomplish significantly higher density recording than CDs as mentioned above, the spot size of the laser beam to read pit information should be set considerably smaller than that for CDs. The spot size of the laser beam is proportional to the wavelength λ of the laser in use and is inversely proportional to the numerical aperture NA of the objective lens. For DVDs, the spot size of the laser beam is decreased by using a laser light source with a short wavelength and an objective lens with a large numerical aperture NA.

It is desirable that DVDs and CDs be optical disks of the same recording type and CDs be playable by a DVD player. When the wavelength λ of the laser is shortened and the numerical aperture NA of the objective lens is increased for DVDs, however, wavefront aberration (mainly coma aberration) occurs even when the disk is slightly inclined. This reduces the margin for the angle of shifting of the disk surface from the perpendicular position with respect to the optical axis of the optical pickup, i.e., the so-called tilt angle. When CDs have a thickness greater than DVDs (e.g, when DVDs have a thickness of 0.6 mm whereas CDs have a thickness of 1.2 mm), wavefront aberration (mainly spherical aberration) occurs at the time CDs are played. This aberration widens the spot size of the laser beam. Therefore, information cannot be read from CDs by directly using the optical pickup for DVDs.

Some schemes have been proposed to overcome the above problem. The schemes include a method of using two objective lenses respectively for DVDs and CDs and switching the lenses to the desired one depending on the types of the target disk, a method of inserting a compensation lens in the collimator portion to correct the disk-based aberration, and a method of utilizing a hologram-used 2-focus lens as the objective lens.

The use of two objective lenses and the use of a compensation lens complicate the mechanism to require larger space, which involve a problem that the whole optical pickup cannot be made compact. The method which uses holograms utilizes diffraction and interference and involves a multibeam, so that this method suffers low light using efficiency and is apt to be influenced by the multibeam oriented interference.

OBJECT AND SUMMARY OF THE INVENTION

Accordingly, it is a primary objective of the present invention to provide an optical pickup which is designed to correct coma aberration and spherical aberration as well as aberration caused by the relative positional deviation of an objective lens to an aberration correcting liquid crystal panel by using this liquid crystal panel and which is thus compatible to both DVDs and CDs.

To achieve the above object, an optical pickup embodying this invention is designed as follows.

According to the first aspect of this invention, an optical pickup having at least a laser light source and an objective lens further comprises an aberration correcting liquid crystal panel arranged on an optical axis of a laser beam.

According to the second aspect, the liquid crystal panel in the optical pickup of the first aspect has a transparent electrode divided into segments in a predetermined pattern, and a refractive index is changeable for each of the segments.

According to the third aspect, the refractive indexes of the segments in the optical pickup of the second aspect are variably controlled by applied voltages.

In the optical pickup according to the second or third aspect, the refractive index may be changed in accordance with the thickness of an optical disk.

In the optical pickup according to the second or third aspect, the refractive index may be changed in accordance with the tilt angle of an optical disk.

In any of the above-described optical pickups, the refractive index may be changed in accordance with the relative positional deviation of the objective lens to the liquid crystal panel.

Because the optical pickup embodying this invention is designed as described above, some retardation can be imparted to the light passing the segments of the liquid crystal panel by altering the refractive indexes of those segments.

Therefore, aberration such as coma aberration or spherical aberration can be corrected by variably controlling the refractive indexes of the segments in accordance with the tilt angle of an optical disk or the type of an optical disk. Accordingly, both DVDs and CDs can be played by using the same optical pickup.

Further, by altering the refractive index in accordance with the positional deviation of the objective lens to the liquid crystal panel, aberration caused by this relative positional deviation can also be eliminated, thus ensuring more accurate aberration correction.

DETAILED DESCRIPTION OF THE PREFERRED EMBODIMENT

A preferred embodiment of the present invention will now be described with reference to the accompanying drawings.

Figure 1:
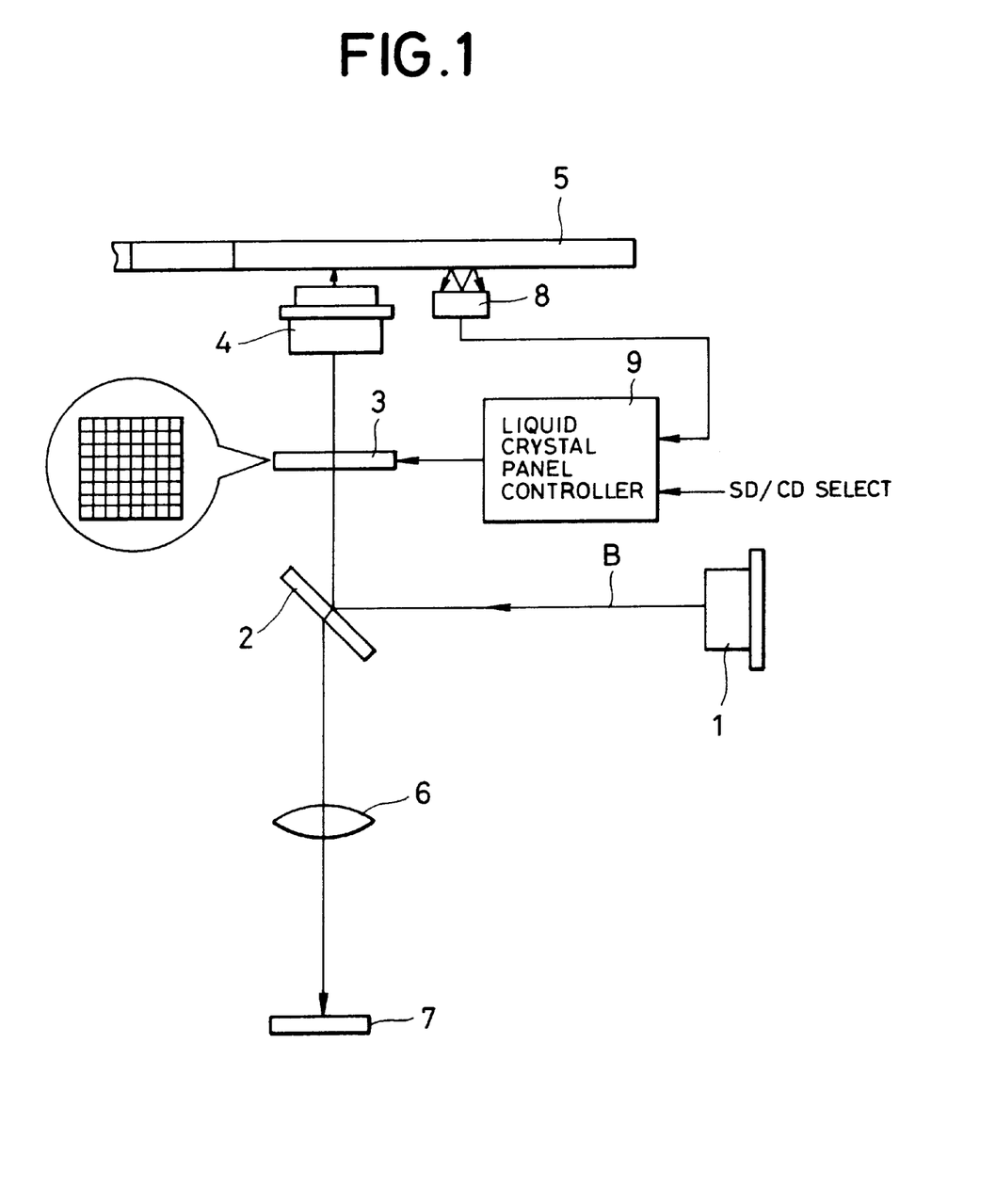
FIG. 1 is a diagram specifically showing an optical pickup according to one embodiment of this invention.

FIG. 1 shows an example of an optical pickup according to this invention.

The diagram illustrates a laser light source 1, a half mirror 2, a liquid crystal panel 3 (hereinafter referred to as "LC panel"), an objective lens 4, an optical disk 5, a condenser lens 6, a light-receiving unit 7, a tilt sensor 8, and an LC panel controller 9.

A laser beam B emitted from the laser light source 1 is reflected at the half mirror 2 in the perpendicular direction, passes through the LC panel 3 and is condensed by the objective lens 4 to be focused on the information recording surface of the optical disk 5. A laser beam reflected from this information recording surface of the optical disk 5 passes through the objective lens 4, the LC panel 3 and the half mirror 2, and forms an image on the light-receiving unit 7 via the condenser lens 6.

As will be apparent from the later description, the LC panel 3 is designed so that at least one transparent electrode is divided into segments in a predetermined pattern like the cross pattern of a chess board, the voltages to be applied to the individual segments are variably controlled based on the tilt angle detected by the tilt sensor 8 and an SD/CD select signal to alter the refractive indexes of the individual segments, thus imparting a retardation to the light rays passing the segments. It is therefore possible to correct aberration such as the coma aberration or spherical aberration of the objective lens.

Figure 2A:
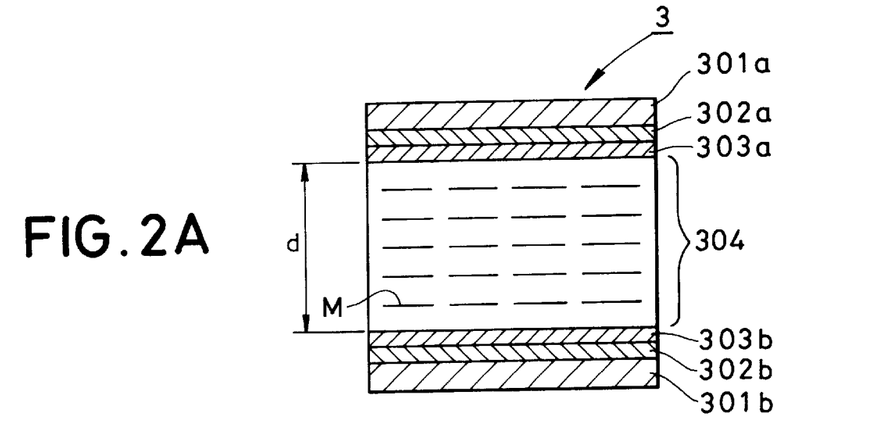
FIGS. 2A and 2B are diagrams exemplifying the structure of a liquid crystal panel.
Figure 2B:
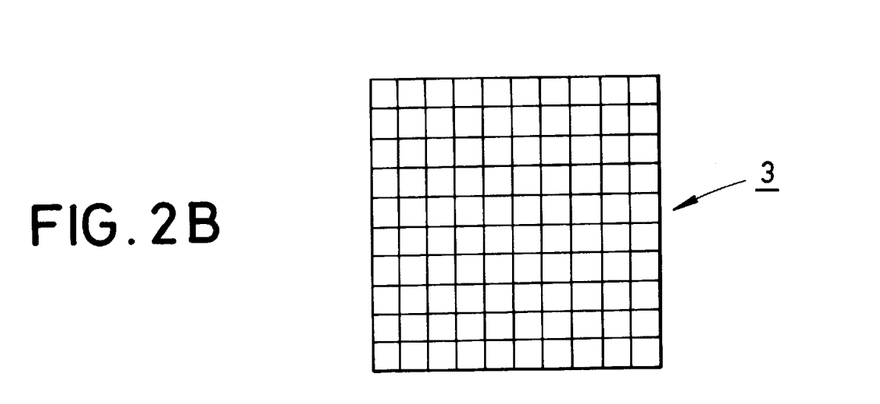

FIGS. 2A and 2B exemplify the structure of the LC panel 3. FIG. 2A is a schematic cross-sectional view of the LC panel 3, and FIG. 2B is a schematic plan view of the LC panel 3.

In the diagrams, transparent electrodes 302a and 302b of ITO or the like are respectively vapor-deposited on the inner surfaces of transparent glass substrates 301a and 301b. Aligning films 303a and 303b are respectively formed on the inner surfaces of the transparent electrodes 302a and 302b to give a predetermined molecular alignment to a liquid crystal. Sealed between the aligning films 303a and 303b is a liquid crystal 304 like a nematic liquid crystal which has a birefringence.

Figure 3:
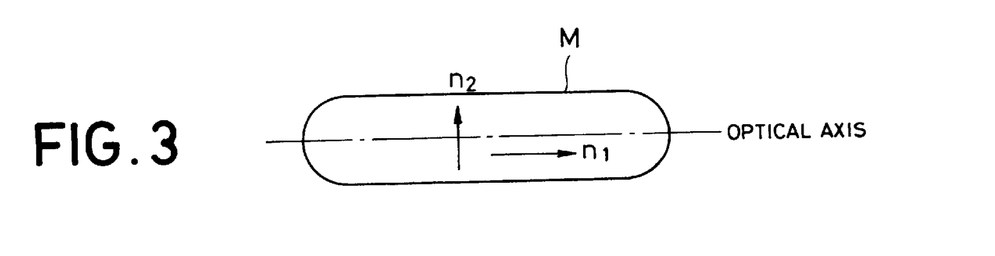
FIG. 3 is an explanatory diagram of liquid crystal molecules.

In the illustrated example, at least one of the transparent electrodes 302a and 302b is divided into the cross pattern of a chessboard and the voltage to be applied to each electrode segment can be variably controlled by the LC panel controller 9. As shown in FIG. 3, the liquid crystal 304 sealed between the glass substrates 301a and 301b have a so-called birefringence effect of having different refractive indexes in the direction of the optical axis of each liquid crystal (LC) molecule M and the direction perpendicular to the former direction.

Figure 4A:
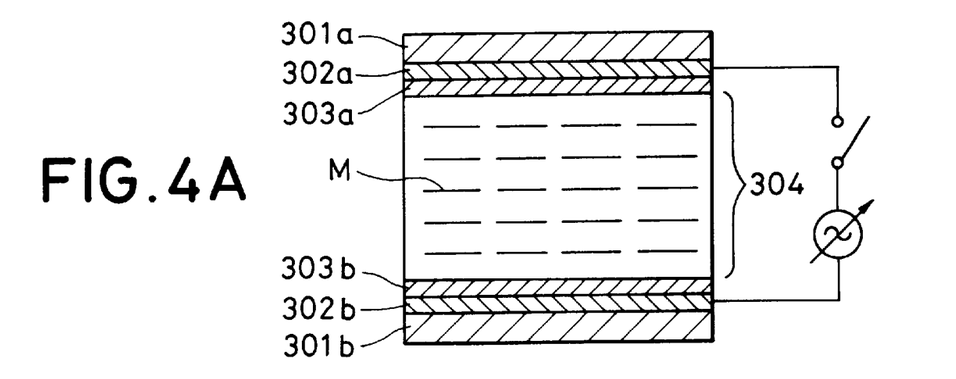
FIGS. 4A through 4C are diagrams for explaining a change in the refractive index of a liquid crystal in accordance with a change in applied voltage.
Figure 4B:
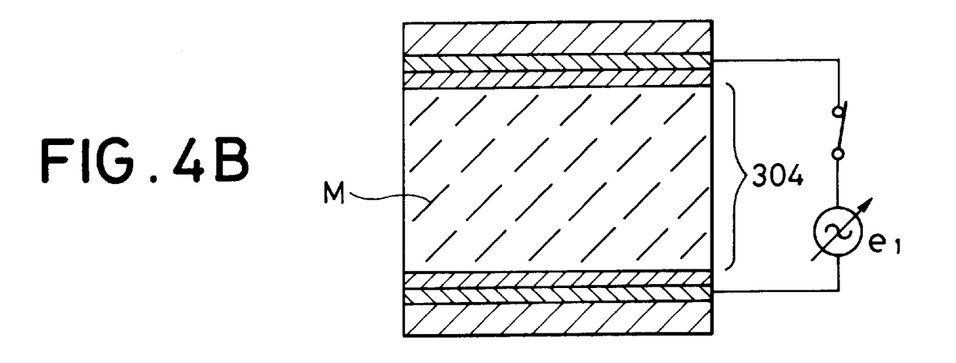
Figure 4C:
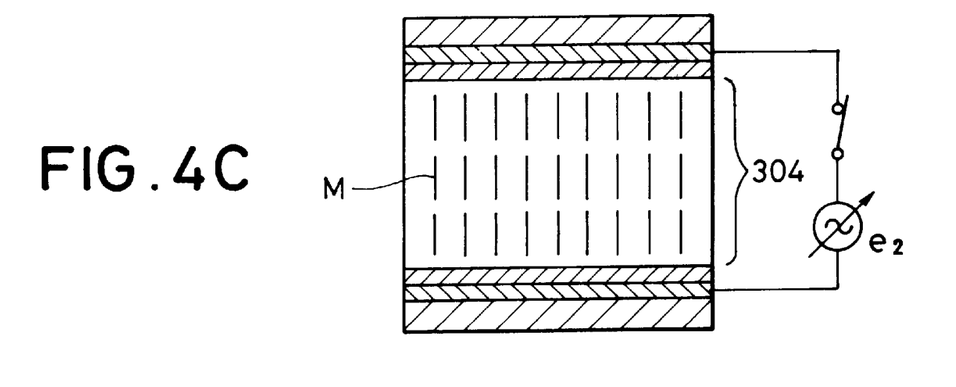

As shown in FIGS. 4A through 4C, the directions of the LC molecules M can be freely changed from the horizontal alignment to the vertical alignment by altering the voltages to be applied to the transparent electrodes 302a and 302b. Therefore, the refractive index n of the liquid crystal at each cross section of the chessboard pattern can be freely altered from $n_1$ to $n_2$ by variably controlling the voltages to be applied to the transparent electrodes 302a and 302b for each said cross section.

The refractive index n of the liquid crystal 3 at each cross section of the chessboard pattern being changeable means that an optical path difference $\Delta n \cdot d$ ($\Delta n$: a change in refractive index, and d: the cell thickness of the liquid crystal 304) or a retardation $\Delta n \cdot d (2\pi/\lambda)$ ($\lambda$: the wavelength of light rays) can be given to the light ray which passes each cross section of the chessboard pattern. Aberration of the objective lens 4 can therefore be corrected by controlling the applied voltages to the individual cross sections of the chessboard pattern to alter their refractive indexes n in accordance with the aberration of the objective lens 4.

Referring to FIGS. 5 through 9, the principle of correcting aberration by the LC panel 3 will now be described.

Figure 5:
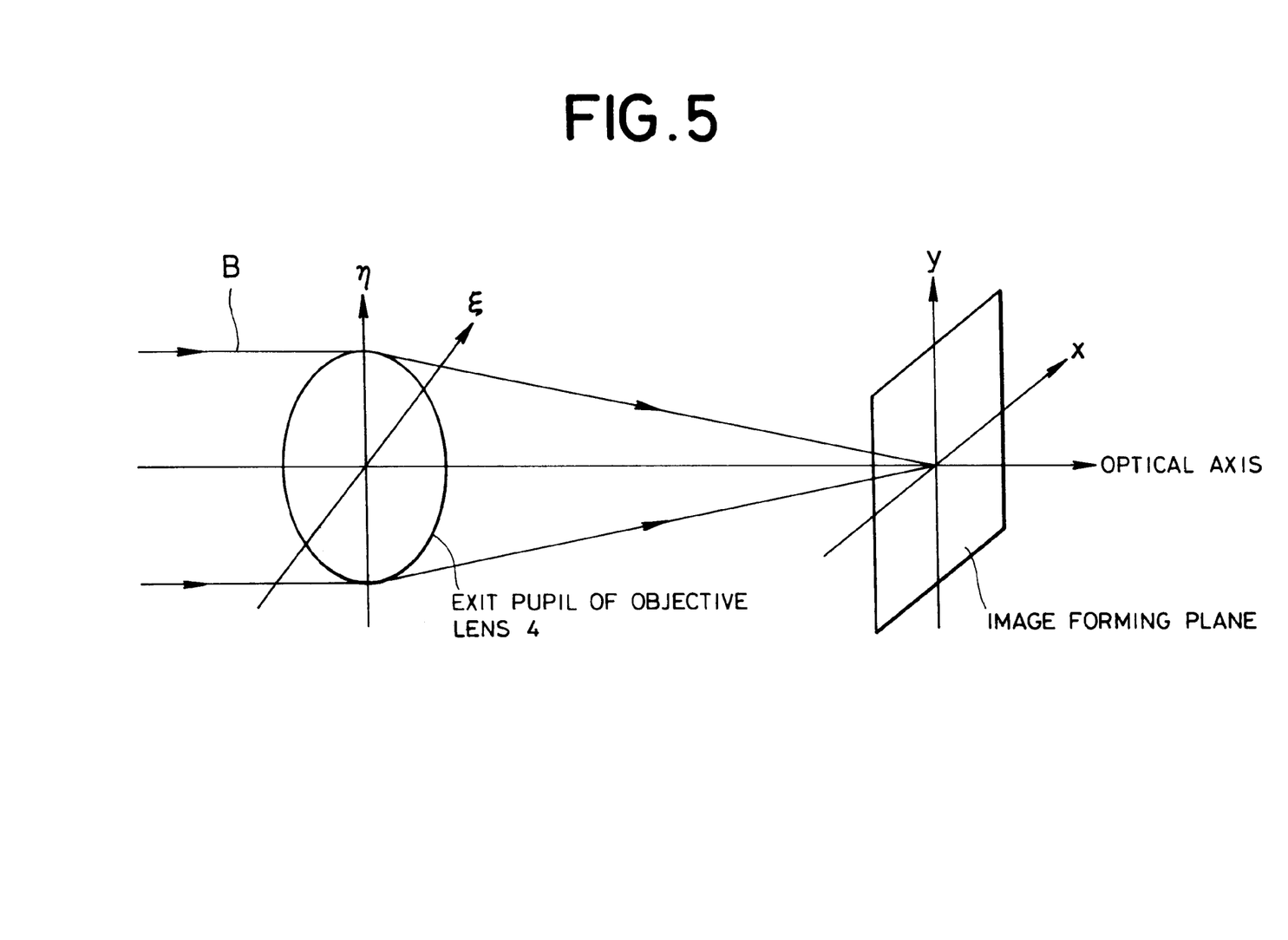
FIG. 5 is a diagram for explaining how an image is formed by an objective lens.

FIG. 5 is a diagram for explaining how an image is formed by the objective lens 4. Given that the exit pupil of the objective lens 4 is a $\xi$-$\eta$ plane and the image forming surface (optical disk surface) is an x-y plane, the amplitude distribution U(x, y) of an image formed on the x-y plane by the laser beam (coherent plane wave) incident to the objective lens 4 is given by the following Fourier transform.

$$U(x, y) = K \int \exp(2\pi i/\lambda) \{-(n/R)(\xi x - \eta y)\} d\xi d\eta \tag{1}$$

where K is a constant, $\lambda$ is the wavelength, n is the refractive index and R is the distance between the exit pupil and the image forming surface.

If the thickness of the optical disk 5 varies or is tilted, wavefront aberration occurs, deteriorating a formed image. Provided that this wavefront aberration is given by W($\xi$, $\eta$), the equation (1) is rewritten as follows.

$$U(x, y) = K \int \exp(2\pi i/\lambda) \{W(\xi, \eta) - (n/R)(\xi x - \eta y)\} d\xi d\eta \tag{2}$$

Figure 6:
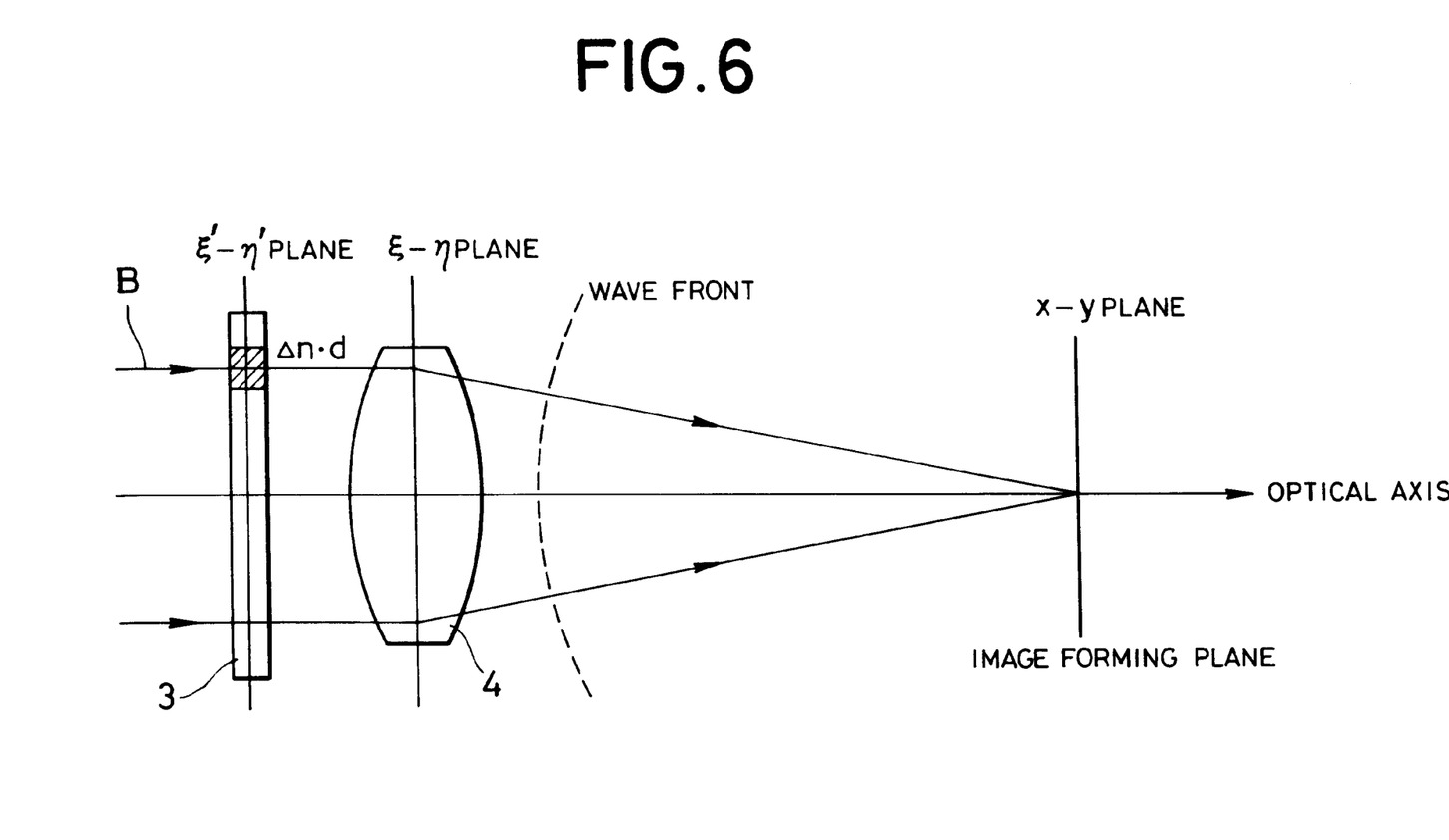
FIG. 6 is a diagram for explaining the formation of an image when a liquid crystal panel is inserted.

To correct the occurred wavefront aberration W($\xi$, $\eta$), the LC panel 3 is inserted before the objective lens 4 as shown in FIG. 6. Suppose that the LC panel 3 is located on a $\xi'$-$\eta'$ plane. When the voltage to be applied to the hatched portion of the LC panel 3 to alter its refractive index n by $\Delta n$, this change in the refractive index n can impart an optical path difference $\Delta n \cdot d$ to the laser beam passing this portion. Given that this optical path difference is expressed over the entire surface of the LC panel by $W_{LC}(\xi, \eta)$, the equation (2) to which the optical path difference $W_{LC}(\xi, \eta)$ by the LC panel 3 is given is expressed as follows.

$$U(x, y) = K \int \exp(2\pi i/\lambda)\{W_{LC}(\xi, \eta) + W(\xi, \eta) - (n/R)(\xi x - \eta y)\} d\mu d\eta \quad (3)$$

It is apparent from this equation (3) that setting $W_{LC}(\xi, \eta) + W(\xi, \eta)$ in the equation to zero can cancel out the wavefront aberration. Therefore, the applied voltages to the individual segments of the LC panel 3 should be variably controlled to alter the refractive indexes n of the cross sections of the chessboard pattern in accordance with the tilt angle or the thickness of the optical disk in such a manner that the term $W_{LC}(\xi, \eta) + W(\xi, \eta)$ becomes zero or minimized.

Figure 7:
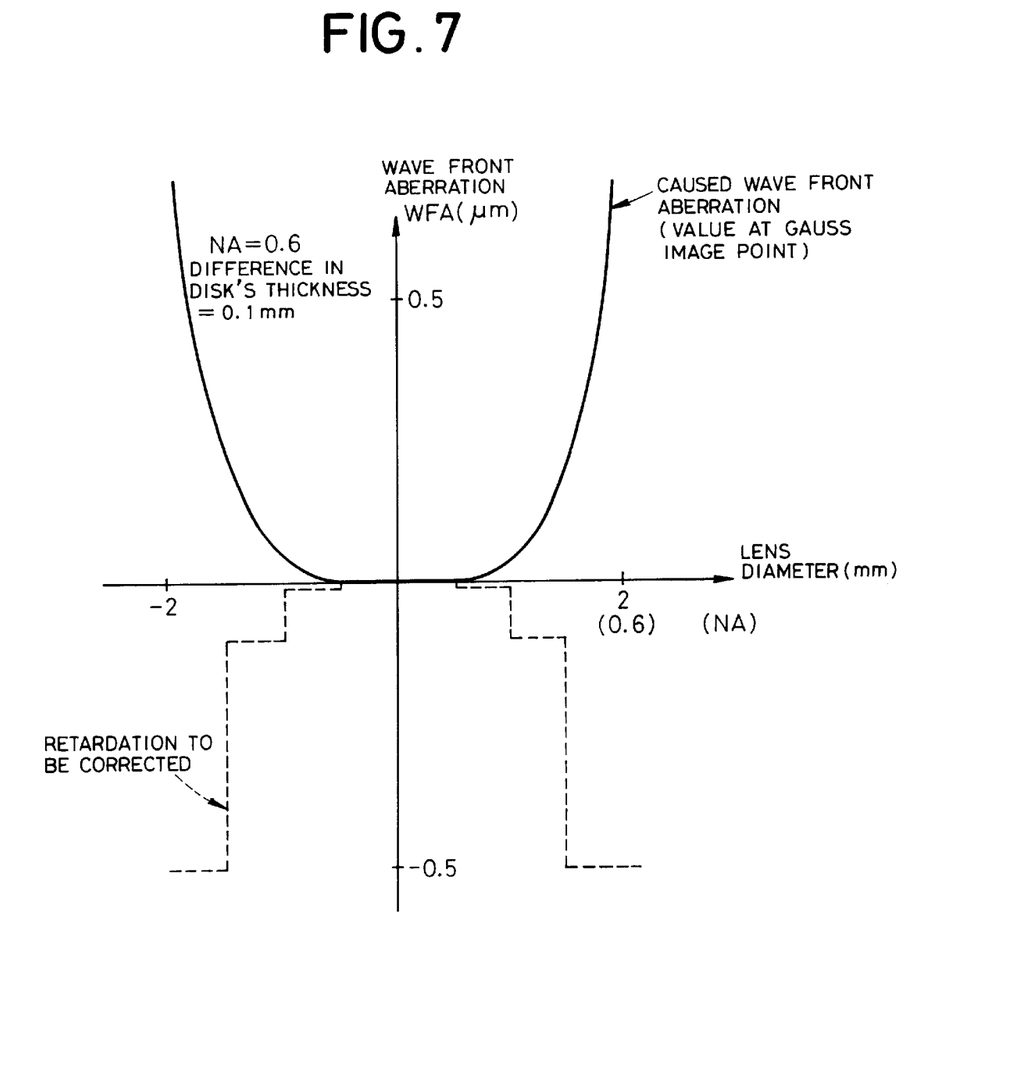
FIG. 7 is a diagram exemplifying the occurrence of wavefront aberration due to a change in the thickness of an optical disk.

FIG. 7 exemplifies the occurrence of wavefront aberration (mainly spherical aberration) in the case where the thickness of the optical disk varies. The caused wavefront aberration becomes greater as the distance from the optical axis increases. As indicated by the broken line in the diagram, therefore, the wavefront aberration can be canceled out by giving the opposite retardation to the one expressed by the solid line using the LC panel 3.

Figure 8:
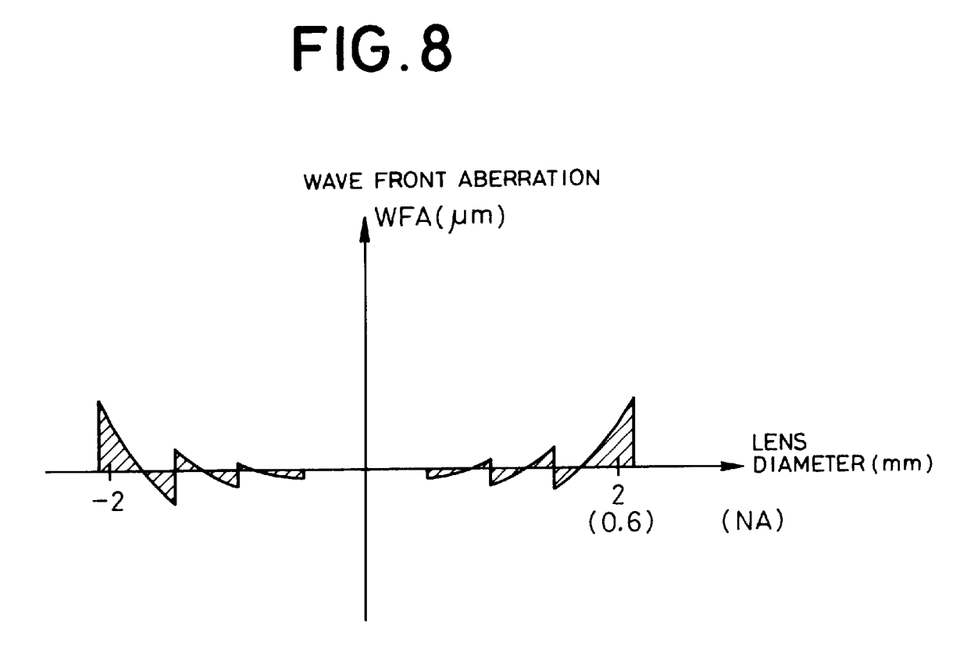
FIG. 8 is a diagram showing wavefront aberration after aberration correction by the liquid crystal panel.

FIG. 8 shows the sum of the solid line and the broken line in FIG. 7 or the wavefront aberration after aberration correction. In the illustrated example, although the wavefront aberration is not completely canceled out due to fewer segments of the LC panel 3 in the chessboard pattern, it is apparently smaller than the original wavefront aberration indicated by the solid line in FIG. 7. The wavefront aberration can be canceled out to the practically insignificant level by increasing the number of segments of the LC panel 3 as much as possible and controlling the applied voltages in such a way that the retardation of each segment goes along the curve of the wavefront aberration indicated by the solid line in FIG. 7.

Figure 9:
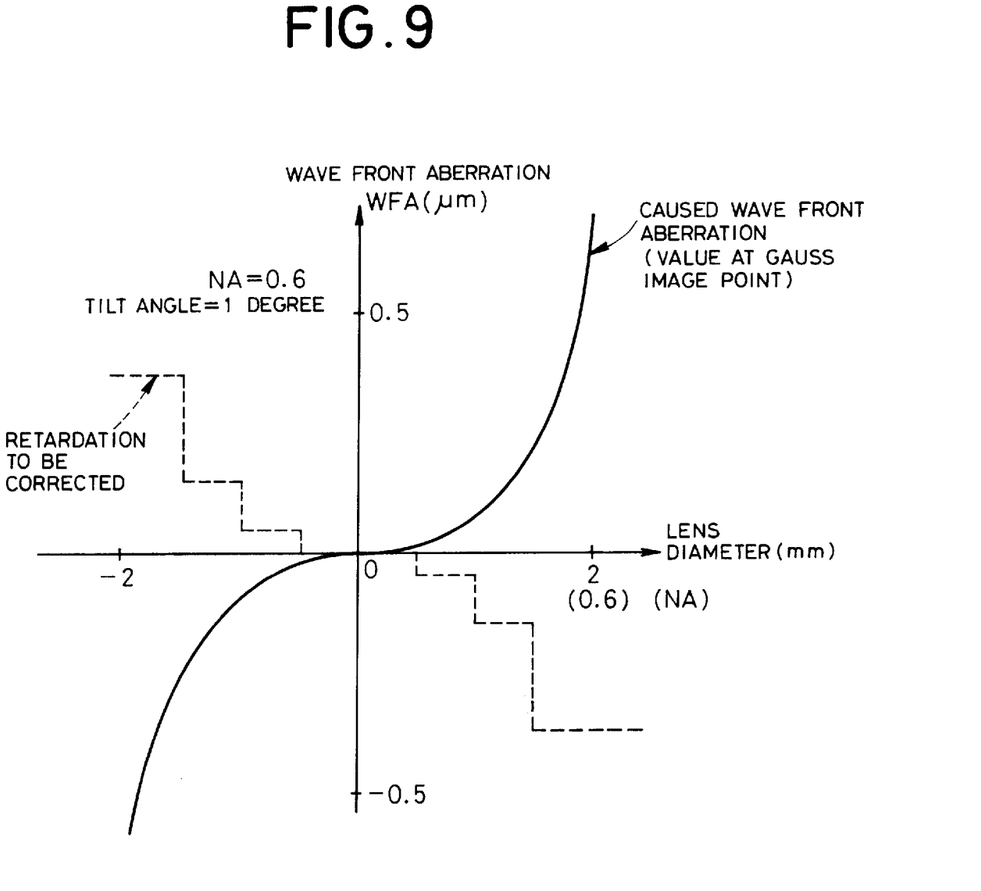
FIG. 9 is a diagram exemplifying wavefront aberration caused by the tilt angle of an optical disk.
Figure 10A:
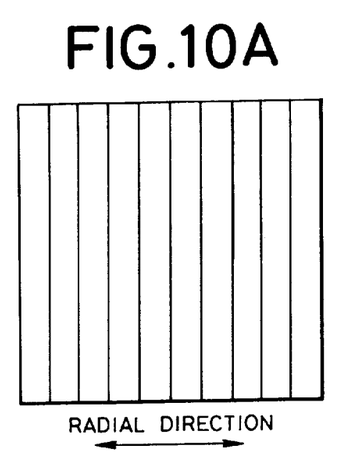
FIGS. 10A through 10E are diagrams showing other examples of a segment pattern of a transparent electrode of the liquid crystal panel.
Figure 10B:
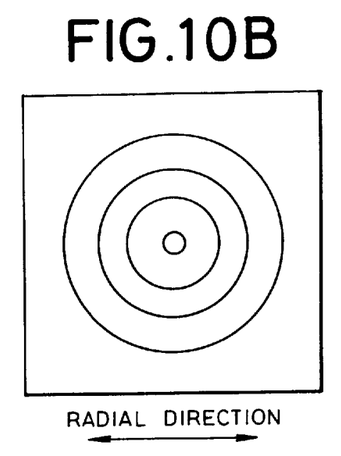
Figure 10C:
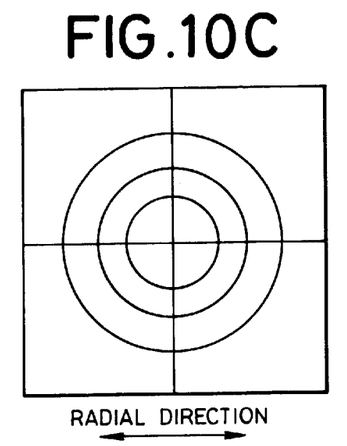
Figure 10D:
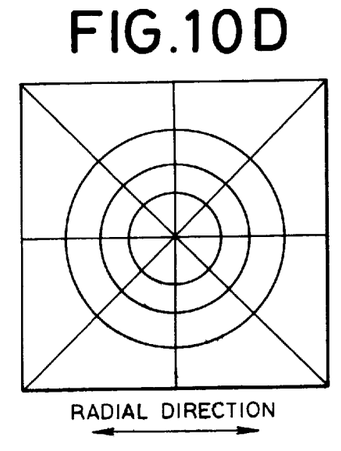
Figure 10E:
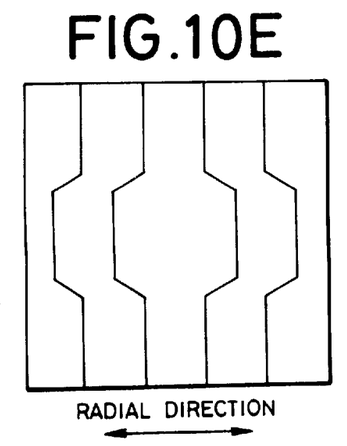

FIG. 9 exemplifies wavefront aberration (mainly coma aberration) caused when the optical disk is tilted. In this case too, the tilt-oriented wavefront aberration can be canceled out by giving retardation as indicated by the broken line to the LC panel 3.

While the principle of the correction of wavefront aberration by the LC panel 3 has been discussed above, this aberration correction is accomplished by variably controlling the voltages to be applied to the individual cross sections of the chessboard pattern of the transparent electrode 302a or 302b of the LC panel 3 by means of the LC panel controller 9 shown in FIG. 1. In other words, when a CD is played, a CD select signal is supplied to the LC panel controller 9, so that the correction of the spherical aberration is executed in accordance with this select signal. Further, the LC panel controller 9 is supplied with the tilt signal from the tilt sensor 8. When the optical disk 5 is tilted, therefore, coma aberration is corrected in accordance with the tilt angle then. Those corrections of the spherical aberration and the coma aberration can be performed simultaneously.

While the tilt sensor 8 is illustrated to be able to detect a tilt in the radial direction in the example shown in FIG. 1, aberration correction with respect to tilting in the tangential (circumferential) direction can likewise be executed by additionally providing a tilt sensor for detection in the tangential direction.

Although the foregoing description has been given with reference to the case where the transparent electrode 302a or 302b of the LC panel 3 is segmented into a chessboard pattern, the segmentation pattern of the transparent electrode in this invention is not limited to this particular pattern but various other patterns as shown in, for example, FIGS. 10A to 10E may also be employed.

The foregoing description is premised on that the relative position of the objective lens 4 to the LC panel 3 does not change. However, the optical disk 5 actually has eccentricity so that the objective lens 4 is always moved in the radial direction of the optical disk 5 by tracking servo when the optical disk 5 is played. The relative position of the objective lens 4 to the LC panel 3 therefore changes in accordance with the level of a tracking error.

The refractive indexes of the individual segments of the LC panel 3 are controlled with the panel center of the LC panel 3 as a reference point on the premise that the panel center matches with the optical axis (pupil center) of the objective lens 4. When a relative positional deviation occurs between the objective lens 4 and the LC panel 3, therefore, aberration according to this positional deviation occurs.

The simplest way of overcoming such a shortcoming is to integrally construct the objective lens 4 and the LC panel 3 so that no relative positional deviation occurs between the objective lens 4 and the LC panel 3. Due to the structural restriction, however, the LC panel 3 cannot be designed smaller than a certain size or lighter than a certain weight. It is thus practically impossible to integrally construct the objective lens 4 and the LC panel 3 and simultaneously move both in accordance with a tracking error.

The optical pickup embodying this invention can easily overcome this problem by merely modifying the method of controlling the refractive indexes of the LC panel 3. This method will now be discussed specifically.

Figure 11A:
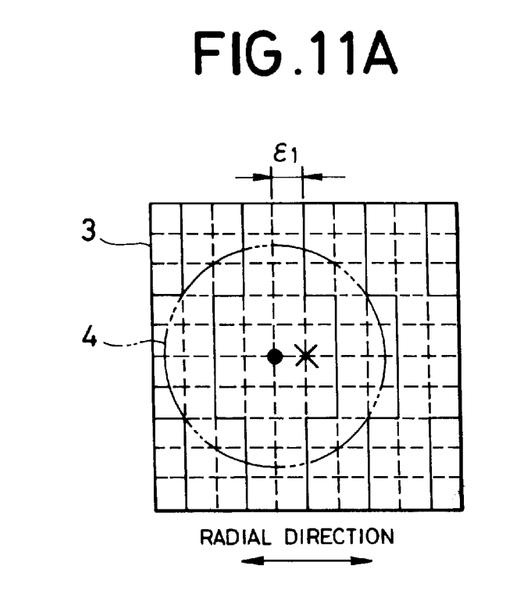
FIGS. 11A through 11C are diagrams exemplifying how to control the refractive index of the liquid crystal panel to eliminate aberration caused by the relative positional deviation of the objective lens to the liquid crystal panel.
Figure 11B:
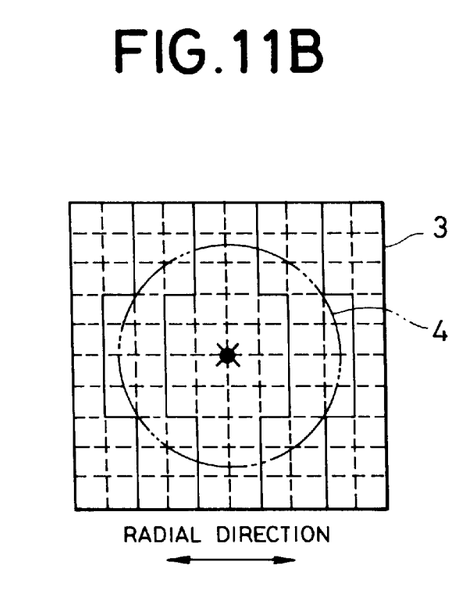
Figure 11C:
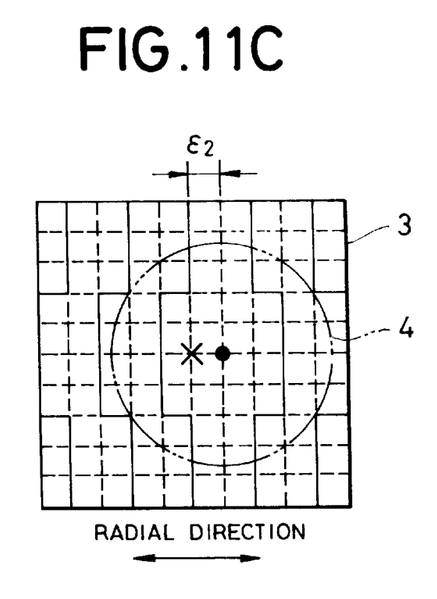

FIGS. 11A through 11C exemplify how to control the relative positional deviation to overcome the aforementioned problem. In the illustrated example, the LC panel 3 in use is segmented in the chessboard pattern shown in FIG. 2.

FIG. 11A shows the control state of the refractive index when the optical axis (mark ●) of the objective lens 4 is shifted leftward by $\epsilon_1$ from the center position (mark X) of the LC panel 3, FIG. 11B shows the control state of the refractive index when the optical axis of the objective lens 4 coincides with the center position of the LC panel 3, and FIG. 11C shows the control state of the refractive index when the optical axis of the objective lens 4 is shifted rightward by $\epsilon_2$ from the center position of the LC panel 3. FIGS. 11A–11C illustrate the control method for setting the refractive indexes symmetrical on the right and left sides of the position of the optical axis as the center, on the premise that tilting occurs in the radial direction.

When the optical axis of the objective lens 4 matches with the center position of the LC panel 3 as shown in FIG. 11B, the refractive indexes of the individual segments of the LC panel 3 are variably controlled in the illustrated pattern with the matched center position of the LC panel 3 as a reference point.

When the optical axis of the objective lens 4 is shifted leftward by $\epsilon_1$ from the center position of the LC panel 3 as shown in FIG. 11A, the refractive indexes of the individual segments of the LC panel 3 are variably controlled in the illustrated pattern with the position of the optical axis shifted by $\epsilon_1$ taken as a reference point.

When the optical axis of the objective lens 4 is shifted rightward by $\epsilon_2$ from the center position of the LC panel 3 as shown in FIG. 11C, the refractive indexes of the individual segments of the LC panel 3 are variably controlled in the illustrated pattern with the position of the optical axis shifted by $\epsilon_2$ taken as a reference point.

By controlling the refractive indexes of the individual segments of the LC panel 3 while shifting the reference point to the position of the optical axis of the moving objective lens 4, the relative positional deviation between the objective lens 4 and the LC panel 3 can be canceled out to eliminate aberration originating from this relative positional deviation.

The above-described positional deviation control requires that the amount of the positional deviation of the objective lens 4, $\epsilon_1$ or $\epsilon_2$, be known in real time. As the positional deviations $\epsilon_1$ and $\epsilon_2$ are proportional to the level of the tracking error, the real-time detection can easily be accomplished by utilizing the return voltage of the tracking actuator for the objective lens 4, for example.

Figure 12:
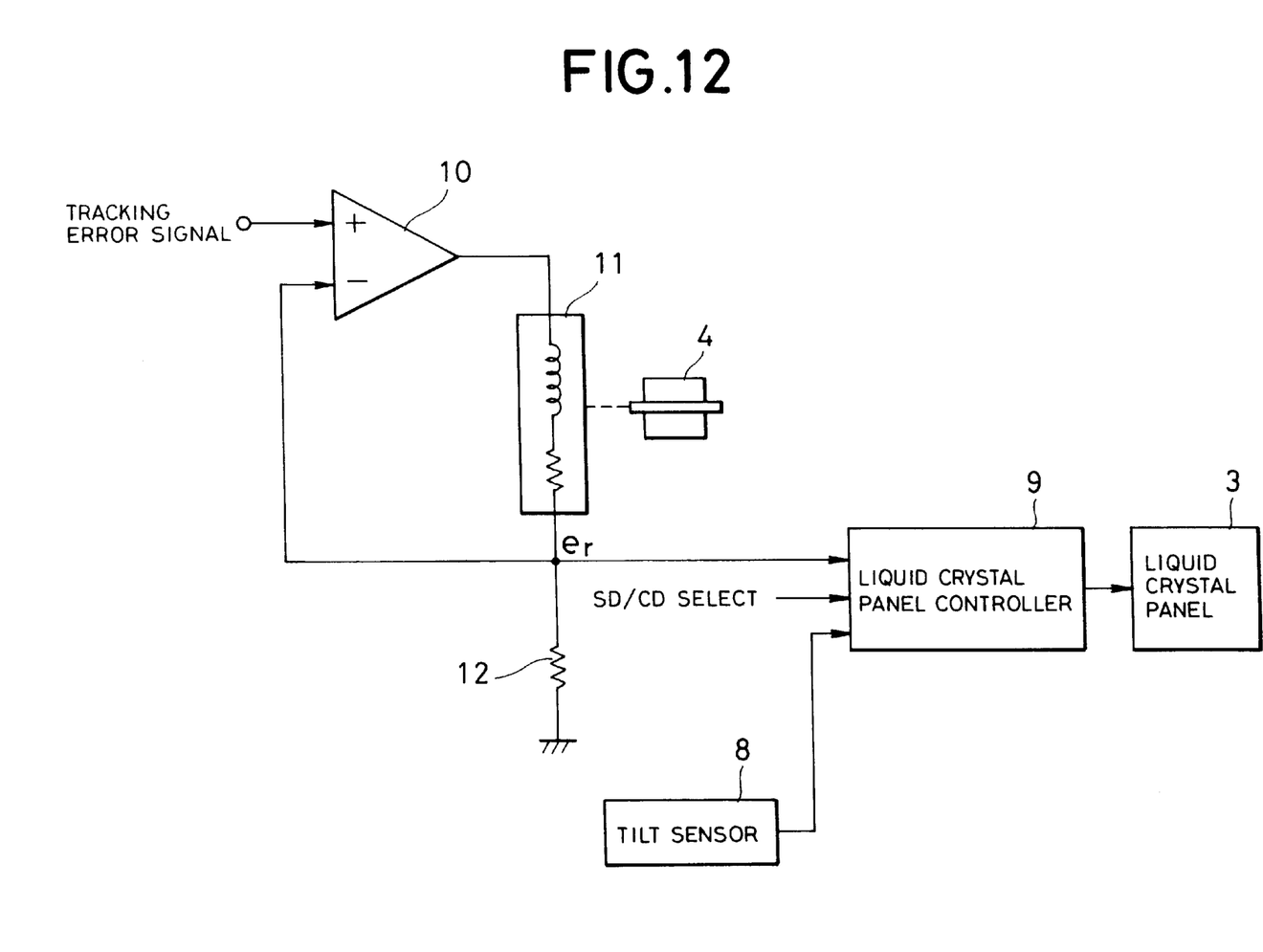
FIG. 12 is a diagram showing one example of the structure of an electric circuit of the optical pickup embodying this invention.

FIG. 12 shows one example of the structure of the electric circuit of the optical pickup embodying this invention which is designed to execute the positional deviation control also using the return voltage of the tracking actuator. This diagram shows the LC panel 3, the objective lens 4, the tilt sensor 8, the LC panel controller 9, a subtracter 10, a tracking actuator 11 and a return resistor 12.

A tracking error signal acquired by an unillustrated tracking servo circuit is sent via the subtracter 10 to the tracking actuator 11. The tracking actuator 11 shifts the objective lens 4 in the radial direction in accordance with this tracking error signal. The amount of the shift of the objective lens 4 is returned to the subtracter as a return voltage $e_r$ generated across the return resistor 12, and is so controlled as to eliminate the tracking error to zero level.

The return voltage $e_r$ is also supplied to the LC panel controller 9. The LC panel controller 9 acquires the shift amount ($\epsilon_1$ or $\epsilon_2$ in FIGS. 11A and 11C) of the objective lens 4 from this return voltage $e_r$, and changes the reference point of the LC panel 3 as shown in FIGS. 11A–11C in accordance with this shift amount to control the refractive indexes in accordance with the relative positional deviation between the objective lens 4 and the LC panel 3. As a result, aberration originating from the relative positional deviation between the objective lens 4 and the LC panel 3 can be canceled.

Although the foregoing operational description has been given only with reference to the control of the refractive indexes with respect to the relative positional deviation between the objective lens 4 and the LC panel 3 for the purpose of easier understanding of this invention, the LC panel controller 9 simultaneously performs aberration correction based on the tilt signal from the tilt sensor 8 and aberration correction based on the SD/CD select signal.

Figure 13:
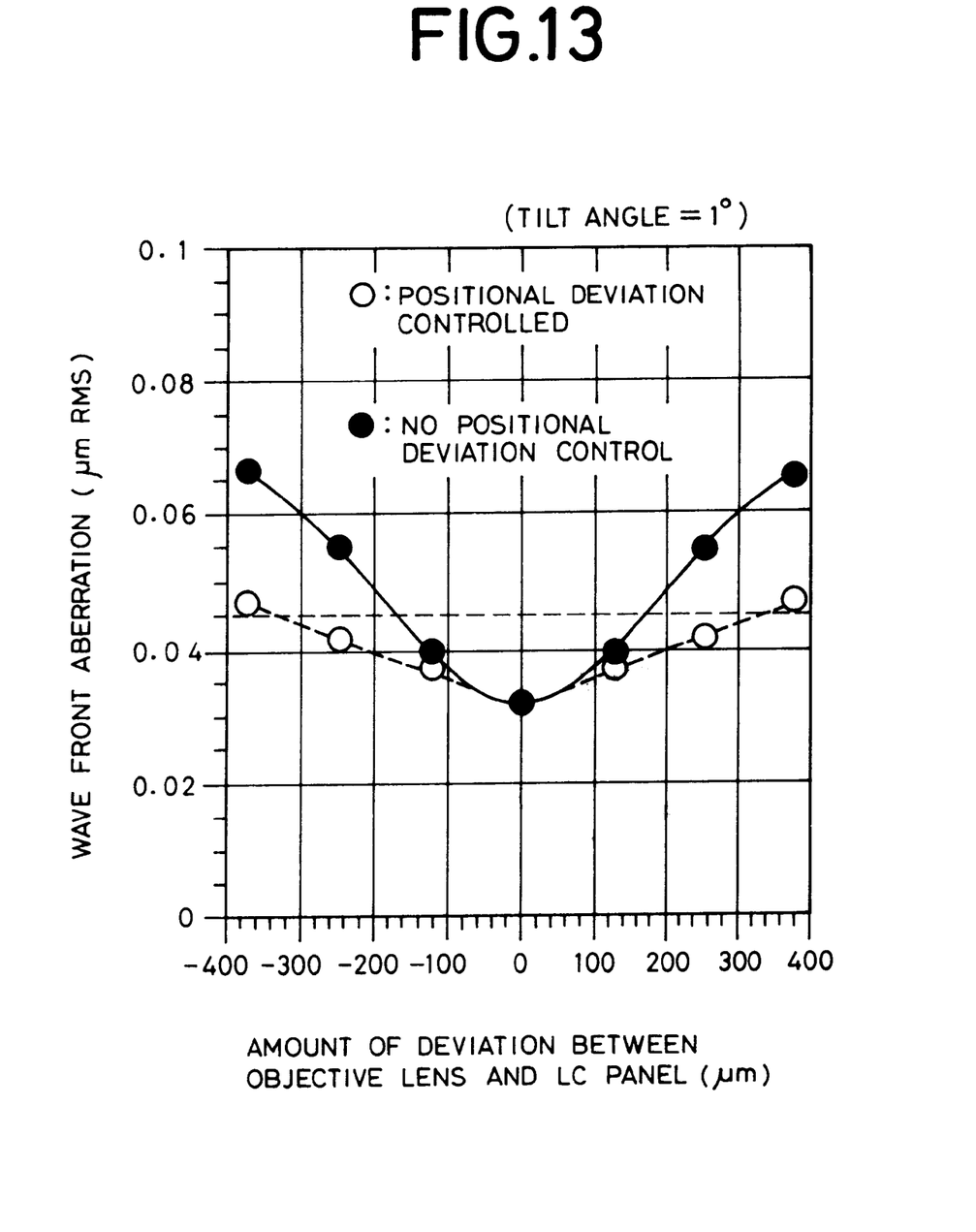
FIG. 13 is a graph specifically exemplifying the amount of the positional deviation of the objective lens to the liquid crystal panel and wavefront aberration caused by this positional deviation.

FIG. 13 specifically shows an example of aberration caused by the positional deviation between the objective lens 4 and the LC panel 3.

The diagram illustrates the relationship between the positional deviation and wavefront aberration caused by this positional deviation when the optical disk 5 is tilted at a tilt angle of 1 degree; the curve plotted by connecting the black dots indicates wavefront aberration caused when no positional deviation control is performed and the curve plotted by connecting the white dots indicates wavefront aberration when the positional deviation control is performed. Although there is wavefront aberration of 0.035 μm even when the amount of the positional deviation is 0, this is inevitable aberration which is based on the characteristics of the whole optical system including the objective lens 4.

It is apparent from the diagram that the positional deviation control when performed reduces the amount of wavefront aberration caused by the positional deviation. For example, wavefront aberration of 0.045 μm (equivalent to 0.07 λ with the use of a laser beam with λ=650 nm) indicated by the straight broken line is said to be the performance limit of the optical pickup. The amount of the positional deviation for providing this value is acquired from the diagram to be ±180 μm when no positional deviation control is performed but it becomes ±300 μm when the positional deviation control is executed. This shows that the positional deviation control widens the allowance of the relative positional deviation between the objective lens 4 and the LC panel 3. It is therefore possible to further improve the performance of the optical pickup.

While the amount of the positional deviation of the objective lens 4 is detected using the return voltage $e_r$ of the tracking actuator 11 in the example illustrated in FIG. 12, this amount of positional deviation may be directly detected by a position sensor additionally attached to the objective lens 4. Although the LC panel 3 in use is divided into the chessboard pattern shown in FIG. 2, it may be divided into segmentation patterns as shown in FIGS. 10A to 10E with the same advantages.

Although only one embodiment of the present invention has been described herein, it should be apparent to those skilled in the art that the present invention may be embodied in many other specific forms without departing from the spirit or scope of the invention.

According to the first aspect of this invention, as described above, an aberration correcting LC panel is arranged on the optical axis of a laser beam, so that aberration such as coma aberration or spherical aberration can be corrected using this LC panel and this optical pickup can be used both DVDs and CDs.

According to the second aspect, the transparent electrode of the LC panel is divided into segments in a predetermined pattern, and a refractive index is changeable for each segment, so that accurate aberration correction is possible.

According to the third aspect, the refractive indexes of the segments of the transparent electrode are variably controlled in accordance with applied voltages, thus simplifying the aberration control.

In the optical pickup according to the second or third aspect, the refractive index is changed in accordance with the thickness of an optical disk, so that aberration caused by a variation in the disk's thickness, particularly, spherical aberration, can be corrected.

In the optical pickup according to the second or third aspect, the refractive index is changed in accordance with the tilt angle of an optical disk, so that aberration caused by the tilting of the optical disk, particularly, coma aberration, can be corrected.

In any of the above-described optical pickups, the refractive index is changed in accordance with the relative positional deviation of the objective lens to the LC panel, so that aberration caused by the relative positional deviation between the objective lens and the LC panel can be suppressed, thus ensuring more accurate aberration correction. This feature can widen allowance for the relative positional deviation between the objective lens and the LC panel, thus further improving the performance of the optical pickup.

What is claimed is:

1. An optical pickup comprising:

a laser light source;

an objective lens, and an aberration correcting liquid crystal panel arranged on an optical axis of a laser beam from said laser light source, wherein said liquid crystal panel has a transparent electrode divided into a predetermined pattern of portions defining segments of said liquid crystal panel, and each of said segments has a changeable refractive index to alter an optical path of light passing through the respective segments.

2. The optical pickup according to claim 1, further comprising a liquid crystal panel controller for applying voltage to variably control said refractive indexes of said segments.

3. The optical pickup according to claim 2, wherein said liquid crystal panel controller changes said refractive index in accordance with a thickness of an optical disk.

4. The optical pickup according to claim 1, further comprising a liquid crystal panel controller for applying voltage to variably control said refractive indexes of said segments in accordance with a thickness of an optical disk.

5. An optical pickup comprising:
a laser light source;
an objective lens;
a liquid crystal panel arranged on an optical axis of a laser beam from said laser light source; and
a liquid crystal panel controller for applying voltage to variably control a refractive index of said liquid crystal panel to alter an optical path of light passing through the liquid crystal panel in accordance with a tilt angle of an optical disk.

* * * * *